United States Patent Office 2,807,613
Patented Sept. 24, 1957

2,807,613
PREPARATION OF 6-METHYL-6-PHENYLTETRAHYDRO-1,3-OXAZINES

Claude J. Schmidle, Moorestown, and Richard C. Mansfield, Haddonfield, N. J., assignors to Rohm & Haas Company, Philadelphia, Pa., a corporation of Delaware No Drawing. Application April 13, 1956,
Serial No. 577,944

7 Claims. (Cl. 260—244)

This invention deals with a method for improving yields of 6-methyl-6-phenyltetrahydro-1,3-oxazines when made from an α-methylstyrene, formaldehyde, and ammonia.

In United States Patent 2,647,117, there is described the reaction of olefins, including α-methylstyrene, with ammonia and formaldehyde in the presence of hydrogen chloride as a catalyst. The reaction yields a mixture of various products from which there can be separated by distillation a modest yield of 6-methyl-6-phenyltetrahydro-1,3-oxazine as an especially useful material.

A way has now been found to increase the yield of this compound and other 6-methyl-6-phenyltetrahydro-1,3-oxazines as prepared by the reaction of an α-methylstyrene, formaldehyde, and ammonia in the presence of a hydrogen halide. After these materials have been brought together and preferably reacted, there is added to the reaction mixture methanol and the resulting mixture is heated and distillate taken therefrom until methanol and other materials distilling therewith, such as methylal, have been substantially removed. The reaction mixture is then rendered alkaline by addition of water-soluble basic material, such as sodium or potassium hydroxide or carbonate or ammonium hydroxide. The desired 6-methyl-6-phenyltetrahydro-1,3-oxazine separates as an oil, is taken off, and purified as by distilling. The yield is now double that obtained by immediate separation of an oil from the reaction mixture and its distillation as heretofore practiced. During the methanol treatment it is evident some substance or substances are converted to the desired tetrahydrooxazine.

As an α-methylstyrene there may be used α-methylstyrene itself or a ring substituted α-methylstyrene with electron-doning groups, as in an α-methylstyrene in which the ring substituent is one such as an alkyl group, particularly an alkyl group of not over four carbon atoms, an ether group such as the methoxy or ethoxy group or an aryl group or a cycloalkyl group. Typical starting materials are p,α-dimethylstyrene, m,α-dimethylstyrene, o,p-α-trimethylstyrene, o,o'-α-trimethylstyrene, p-ethyl-α-methylstyrene, m-ethyl-α-methylstyrene, p-isopropyl-α-methylstyrene, p-tert-butyl-α-methylstyrene, p-cyclohexyl-α-methylstyrene, p-phenyl-α-methylstyrene, p-methoxy-α-methylstyrene, p-ethoxy-α-methylstyrene, α- or β-isopropenylnaphthalene, or isopropenylmethylnaphthalene. The preferred starting compounds may be defined by the general formula

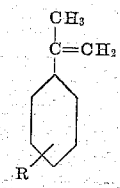

where R is hydrogen, alkyl of not over four carbon atoms, cycloalkyl, phenyl, or alkoxy of not over two carbon atoms. Other hydrogen-doning groups are equivalent to these.

Formaldehyde may be used in the form of aqueous solutions, of solutions in alcohols, conveniently in methanol, where it may exist in the form of a hemiformal, or of a revertible polymer. Usually formaldehyde is used in excess based on molar proportions referred to the α-methylstyrene, proportions from about 1.5:1 to 5:1 being practical. Of course, with less than a 2:1 proportion unreacted starting materials may be present in the reacting mixture. Preferred proportions are from 2:1 to 4:1.

Ammonia may be supplied as a gas or as an aqueous solution or in the form of ammonium chloride or bromide. Of course, if ammonia or ammonium hydroxide is used, it will react with the hydrochloric or hydrobromic acid which is added as catalyst. The same final result is obtained by use of the preformed ammonium halide, which supplies both the ammonia and the catalyst. The amount of ammonia or ammonium compound is usually at least equivalent to the α-methylstyrene and may be in considerable excess thereof. The preferred ratios of ammonia to an α-methylstyrene are from about 1.5:1 to 2.5:1.

The order in which the α-methylstyrene, formaldehyde, ammonia, and catalyst are mixed is immaterial. Formaldehyde and ammonia or ammonium halide may be mixed, even though there may be interaction and an α-methylstyrene added to this mixture or the mixture to the α-methylstyrene. Other orders of mixing are likewise effective.

If an ammonium halide is not used, hydrochloric acid or hydrobromic acid or hydrogen chloride or hydrogen bromide is added at any convenient stage. The amount supplied is usually best about equivalent to the ammonia, but smaller or larger amounts may be used. The catalysts have a molecular weight from about 36 to 81.

The reaction mixture is heated between about 45° and about 120° C. until good conversion is obtained. The reaction is exothermic and sometimes it may be desirable to limit the rate of addition of reactants and/or supply cooling. Usually in one-half to four hours reaction is complete. The reaction mixture may, if desired, be heated for a longer time, particularly when larger ring-substituents are present.

There is then added about one to twelve moles of methanol per mole of the α-methylstyrene and the resulting mixture is best warmed to initiate reaction. The mixture is then heated to reflux, then distilled, and distillate is taken off until substantially all or most of the methanol present and other materials distilling therewith such as methylal are removed. The residue is rendered alkaline. The oil which forms is separated and distilled under reduced pressure.

The 6-methyl-6-phenyltetrahydro-1,3-oxazines which are thus obtained are useful as corrosion inhibitors, as catalysts for use as a weak base for preparing polyurethane foams, and as chemical intermediates, being rearranged by strong acids to tetrahydropyridines from which piperidinols and their esters can be prepared.

A good procedure for preparing 6-methyl-6-phenyltetrahydro-1,3-oxazines is given in the following detailed example, which is given by way of illustration and not by way of limitation, the procedure being generally applicable to the reaction of any of the above noted α-methylstyrenes, their homologues or isomers.

There are mixed 236 parts by weight of α-methylstyrene, 668 parts of aqueous 37% formaldehyde solution, and 216 parts of ammonium chloride. The mixture is stirred and heated to about 60° C. An exothermic reaction ensues which is controlled by external cooling to maintain the temperature at about 55°–65° C. When the exothermic reaction is over, the reaction mixture is allowed to cool to about 40° C. over a period of about an hour. There is added methanol to a total of 450 parts. The mixture is stirred for several hours and later heated on a steam bath. Distillate is taken off. The alcohol-free mixture at this point contains the hydrochloride salt of 6-methyl-6-phenyltetrahydro-1,3-oxazine. If desired, this salt could be isolated, or utilized directly as it exists in solution, for many purposes, e. g. as a corrosion inhibitor or as a chemical intermediate for forming many other useful products. If it is desired, however, to isolate the free base, the alcohol-free mixture is treated with aqueous 50% sodium hydroxide solution until basic. An oil separates and is taken up with toluene, the organic layer being separated, dried, and distilled. At 95°–110° C./1 mm. there are obtained 236 parts of 6-methyl-6-phenyl-tetrahydro-1,3-oxazine. This is redistilled and a center-cut taken for analysis. It has a refractive index, $n_D^{25}$, of 1.5382 and contains by analysis 74.58% of carbon, 8.94% of hydrogen, and 7.74% of nitrogen, theory being 74.54%, 8.53%, and 7.90% respectively. The yield is 67%.

The hydrochloride is formed therefrom upon addition of an equivalent amount of hydrochloric acid. This salt is recrystallized from acetone containing 5% isopropyl alcohol. The hydrochloride melts at 147°–149° C. By analysis it contains 61.15% of carbon, 7.67% of hydrogen, 6.62% of nitrogen, and 16.7% of chlorine. Corresponding theoretical values are 61.82%, 7.55%, 6.56%, and 16.6% respectively.

A comparable preparation according to the art comprises mixing 1200 parts of aqueous 35% formaldehyde solution, 278 parts of ammonium chloride, and 620 parts of α-methylstyrene. The mixture is heated to 66° C. when an exothermic reaction ensues. The reaction mixture is extracted with ether and the aqueous layer is made basic with alkali and the resulting oil is separated and distilled. A fraction of 44.5 parts is taken at 43.5°–108.5° C./1.4–1.6 mm. of 188.5 parts, and a third at 111.5°–115° C./0.9 mm. of 57.5 parts. These fractions contain the 6-methyl-6-phenyl-tetrahydro-1,3-oxazine. The total amount of 290.5 parts of distillate amounts to a yield of 31%, if all counted as the desired product.

When the procedure of the above example is applied to an p-methyl-α-methylstyrene in a weight equivalent to the above α-methylstyrene there is obtained 6-methyl-6-p-tolyltetrahydro-1,3-oxazine, distilling at 110°–120° C./1 mm. in a yield of 65%. The same procedure applied to p-isopropyl-α-methylstyrene to give a 69% yield of 6-isopropylphenyl-6-methyltetrahydro-1,3-oxazine, distilling at 130°–140° C./1 mm. Likewise from p-tert-butylphenyl-α-methylstyrene there is obtained in 60% yield 6-tert-butylphenyl-6-methyltetrahydro-1,3-oxazine, distilling at 141°–152° C./1 mm. From p-methoxy-α-methylstyrene there is obtained 6-methoxyphenyl-6-methyltetrahydro-1,3-oxazine, distilling at 118°–131° C./0.3 mm.

We claim:

1. A process for preparing 6-methyl-6-phenyltetrahydro-1,3-oxazines which comprises reacting an α-methylstyrene, formaldehyde, and ammonia in the presence of a hydrogen halide of a molecular weight of 36 to 81, adding methanol to the resulting reaction product and heating this mixture to reflux, distilling the mixture, removing the distillate until most of the methanol present and other products distilling therewith, such as methylal, have been removed, adding a water-soluble basic material, whereby an oil is formed, separating said oil, and isolating the 6-methyl-6-phenyltetrahydro-1,3-oxazine.

2. A process for preparing 6-methyl-6-phenyltetrahydro-1,3-oxazine which comprises reacting between about 45° and 125° C. α-methylstyrene of the structure.

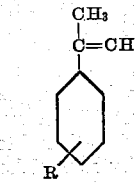

wherein R is a member of the class consisting of hydrogen, alkyl groups of not over four carbon atoms, cycloalkyl groups, the phenyl group, and alkoxy groups of not over two carbon atoms, formaldehyde, and ammonia, the formaldehyde and ammonia being in molecular excess of the said α-methylstyrene, in the presence of a hydrogen halide of a molecular weight from about 36 to 81 in an amount about equivalent to the ammonia, adding methanol to the reaction product and heating this mixture to reflux, distilling the mixture, removing the distillate until most of the methanol present and other products, such as methylal, distilling therewith have been removed, adding a water-soluble basic material, whereby an oil is formed, and separating out the oil which is the desired 6-methyl-6-phenyltetrahydro-1,3-oxazine.

3. A process for preparing 6-methyl-6-phenyltetrahydro-1,3-oxazine which comprises reacting between about 45° and 125° C. α-methylstyrene formaldehyde, and ammonia in the presence of hydrogen chloride, the formaldehyde and ammonia being in molecular excess of the α-methylstyrene and the hydrogen chloride being about equivalent to the ammonia, adding methanol to the reaction product and heating this mixture to reflux, distilling the mixture, removing the distillate until most of the methanol present and other products distilling therewith, such as methylal, have been removed, adding a water-soluble basic material, whereby an oil is formed, and separating out the oil which is the desired 6-methyl-6-phenyltetrohydro-1,3-oxazine.

4. A process for preparing 6-methyl-6-p-tolyltetrahydro-1,3-oxazine which comprises reacting between about 45° and 125° C. p,α-dimethylstyrene, formaldehyde, and ammonia in the presence of hydrogen chloride, the formaldehyde and ammonia being in molecular excess of the p,α-dimethylstyrene and the hydrogen chloride being about equivalent to the ammonia, adding methanol to the reaction product and heating this mixture to reflux, distilling the mixture, removing the distillate until most of the methanol present and other products, such as methylal, distilling therewith have been removed, adding a water-soluble basic material, whereby an oil is formed, and separating out the oil which is the desired 6-methyl-6-p-tolyltetrahydro-1,3-oxazine.

5. A process for preparing 6-isopropylphenyl-6-methyltetrahydro-1,3-oxazine which comprises reacting between about 45° and 125° C. isopropyl-α-methylstyrene, formaldehyde, and ammonia in the presence of hydrogen chloride, the formaldehyde and ammonia being in molecular excess of the isopropyl-α-methylstyrene and the hydrogen chloride being about equivalent to the amonia, adding methanol to the reaction product and heating this mixture to reflux, distilling the mixture, removing the distillate until most of the methanol present and other products distilling therewith, such as methylal, have been removed, adding a water-soluble basic material, whereby an oil is formed, and separating out the oil which is the desired 6-isopropylphenyl-6-methyltetrahydro-1,3-oxazine.

6. A process for preparing 6-methoxyphenyl-6-methyltetrahydro-1,3-oxazine which comprises reacting between about 45° and 125° C. methoxy-α-methylstyrene, formaldehyde, and amonia in the presence of hydrogen chloride, the formaldehyde and amonia being in molecular excess of the methoxy-α-methylstyrene and the hydrogen chloride being about equivalent to the ammonia, adding methanol to the reaction product and heating this mixture to reflux, distilling the mixture, removing the distillate until most of the methanol and other products distilling therewith, such as methylal, have been removed, adding a water-soluble basic material whereby an oil is formed, and separating out the oil which is the desired 6-methoxyphenyl-6-methyltetrahydro-1,3-oxazine.

7. A process for preparing 6-methyl-6-phenyltetrahydro-1,3-oxazine hydrochloride which comprises reacting α-methylstyrene, formaldehyde, and ammonia in the presence of a hydrogen halide of a molecular weight of 36 to 81, adding methanol to the resulting reaction product, distilling this mixture, and removing the distillate until most of the methanol present, and other products distilling therewith, such as methylal, have been removed, whereby there is formed 6-methyl-6-phenyltetrahydro-1,3-oxazine hydrochloride.

References Cited in the file of this patent

UNITED STATES PATENTS

| | | |
|---|---|---|
| 2,647,117 | Hartough et al. | July 28, 1953 |
| 2,647,118 | Hartough et al. | July 28, 1953 |